April 21, 1959 G. WOLF 2,882,817

METHOD AND APPARATUS FOR TRANSLATING MULTI-ORDER SIGNALS FROM A MAGNETIC RECORD OF PRINT

Filed March 4, 1958 5 Sheets-Sheet 1

INVENTOR
Gerhard Wolf
by: Michael S. Striker
Attorney

INVENTOR
Gerhard Wolf
by: Michael S. Striker
Attorney

INVENTOR
Gerhard Wolf
By: Michael S. Striker
Attorney

April 21, 1959 G. WOLF 2,882,817

METHOD AND APPARATUS FOR TRANSLATING MULTI-ORDER SIGNALS FROM A MAGNETIC RECORD OF PRINT

Filed March 4, 1958 5 Sheets-Sheet 4

INVENTOR

Gerhard Wolf by:

Michael S. Striker

Attorney

INVENTOR
Gerhard Wolf
By: Michael S. Striker
Attorney

United States Patent Office
2,882,817
Patented Apr. 21, 1959

2,882,817

METHOD AND APPARATUS FOR TRANSLATING MULTI-ORDER SIGNALS FROM A MAGNETIC RECORD OF PRINT

Gerhard Wolf, Munich-Pasing, Germany, assignor to Kienzle Apparate G.m.b.H., Munich, Germany Application March 4, 1958, Serial No. 719,129

Claims priority, application Germany March 8, 1957

8 Claims. (Cl. 101—93)

The present invention relates to a method and an apparatus for controlling a printing apparatus for reproducing in print multi-order signals which are recorded on a magnetic storage means. More particularly, the method and apparatus referred to is intended to be applied to a multi order printing apparatus having for every order an individual digit printing device moving sequentially from one to the next digit printing position, for reproducing multi-order number signals which may contain any digit value in each individual order while one complete multi-order signal is delivered in each operational cycle from the magnetic storage means.

It should be understood that throughout the following specification and in the claims any reference to number signals, digits and digit values as well as to orders and order positions is to be interpreted to include with equivalent meaning signals containing information on letters of the alphabet, their consecutive positions within a word or message, as well as code signals symbolizing letters or numbers and their respective arrangement within a transmitted series thereof.

For the purpose of picking up from a magnetic storage means, for instance a storage drum, a multi-order number or a multi-letter word, and for the purpose of printing such information, it has been necessary up to now to provide an intermediate storage means, e.g. magnet core storage means, having the capacity of storing the entire multi-order number or multi-letter word recorded on the storage drum. Under these circumstances the entire record of the drum had to be transferred to the intermediate storage means and only after that the information stored in the intermediate storage means could be reproduced in print.

Conventionally, one of three different printing methods are used for the above purpose:

(*a*) by means of output lines associated respectively with individual digit values the printing apparatus is moved into printing position for that particular digit which is delivered from the intermediate storage means during each revolution thereof corresponding to one order. In this case the above-mentioned output lines for each digit are branched off an order unit in the intermediate storage means for the purpose of actuating the printing device in which a separate individual printing solenoid is arranged and associated with each individual digit;

(*b*) in a second printing method the individual printing magnets are not associated with individual digits but with the individual orders of the multi-order number to be printed. These magnets are actuated stepwise at such moments of time as correspond to the individual digits. This method applies, for instance, to printing apparatus comprising rotating type discs continuously turned together with toothed wheels respectively associated therewith so that the type discs and associated toothed wheels can be stopped in any one position permitting the printing of a particular digit. However, in this case, the selective picking up of digit values from the record must be operated synchronously with the movement of the type discs into the corresponding digit printing positions;

(*c*) in a third method comparatively slow counting impulses which consecutively drain the stored information from the intermediate storage means actuate a solenoid which moves a type bar step-by-step into the required printing positions for the particular digits.

It is a requirement in all these three printing methods that the signals recorded on the drum are received in series in the intermediate storage means and that the stored information is obtained from the intermediate storage means simultaneously either in consecutive orders (case *a*) or in consecutive digits (cases *b* and *c*). Provided that the intermediate storage means consists of a long storage register, no problem is involved since in this case it is possible without any difficulty to inject a series of individual signals and since the individual digit as well as the progress from order to order corresponds to characteristics of the information which is stored. An arrangement of this type is particularly suitable for the method of case *b*.

It is therefore a main object of this invention to provide a method and apparatus for controlling a multi-order printing apparatus for the reproduction of multi-order signals recorded on a magnetic storage means in such a manner that the use of intermediate storage means is entirely eliminated.

It is another object of this invention to provide a method and apparatus of the type set forth wherein the printed reproduction is derived from a comparatively rapidly rotating magnetic storage drum without requiring synchronism between that drum and the printing device.

In view of the above objects, the present invention provides for a method and for means on account of which during each operational cycle of the storage means the entire recorded information passes by a pick-up head which furnishes a sequence of signals to selector means which squentially collects certain elements of the entire recorded signal and causes such elements to be printed immediately. This process is then repeated for one element of the signal after the other until all elements thereof are reproduced in print. In this procedure, according to a basic feature of this invention, said selector means include a first selector which determines the digit value of each individual element collected, and a second selector which determines the sequence in which the individual digit values are collected by said first selector. In the apparatus according to the invention a digit selector cooperates with an order selector in such a manner that during each operational cycle or rotation of the magnetic storage means one digit value after the other is picked up, collected and printed. The only important condition for this type of operation consists in that the magnetic storage drum rotates at such a rate that at least one rotation is completed during the time required for moving the printing devices from one to the next digit printing position which may be equivalent to the step made by a toothed bar or a toothed wheel and corresponding to the spacing of one tooth from the next. The selector means are capable to detect whether a particular digit value is present in a particular order of the total signal stored in the drum. The digit selector and the order selector cooperate with a coincidence device which combines the output of the digit selector with that of the order selector in such a manner that a given digit value (as determined by a particular printing position of the printing apparatus) is stored in a coincidence register in a sequence which corresponds to the order position of that particular digit in the stored drum record.

More specifically, the method according to this invention essentially comprises the steps of picking up in cyclical repetition from the multi-order number signal record on a storage means in timed sequence digit signals each representing the individual digit value that may be present in consecutive orders of said multi-order number signal record, each cycle being in step with the movement of the controlled printing devices from one digit position to the next one; generating during each cycle consecutive impulses in step with said timed sequence of the digit signals, said impulses being individually associated with the individual consecutive orders, respectively, of the multi-order number signal; combining said individual digit signals with said impulses so as to obtain a sequence of output signals, each being characteristic of a digit value and of its order position in the multi-order number to be reproduced; and actuating the printing apparatus by each of said output signals for printing the particular digit in its order position as indicated by the respective output signal.

In another aspect of this invention, an arrangement for controlling a multi-order printing apparatus for reproducing in print multi-order number signals recorded on a magnetic storage means essentially comprises, in combination, means for picking up in cyclical repetition from the multi-order number signal record on said storage means in timed sequence digit signals each representing the individual digit value that may be present in consecutive orders of said multi-order number signal record, each cycle being in step with the movement of said printing devices from one digit position to the next one; means for generating during each cycle consecutive impulses in step with said timed sequence of said digit signals, said impulses being individually associated with the individual consecutive orders, respectively, of said multi-order number signal; means, operatively connected with said means for picking up signals and with said means for generating impulses, for combining said individual digit signals with said impulses so as to obtain a sequence of output signals, each being characteristic of a digit value and of its order position in the multi-order number to be reproduced; and means, operatively connected with said means for combining said signals with said impulses, for actuating said printing apparatus by each of said output signals for printing the particular digit in its order position as indicated by the respective output signal.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a general diagram illustrating an arrangement capable of carrying out the method according to this invention;

Fig. 1*a* is a time diagram illustrating the time relationship of the various steps involved in the method according to this invention;

Figure 1:
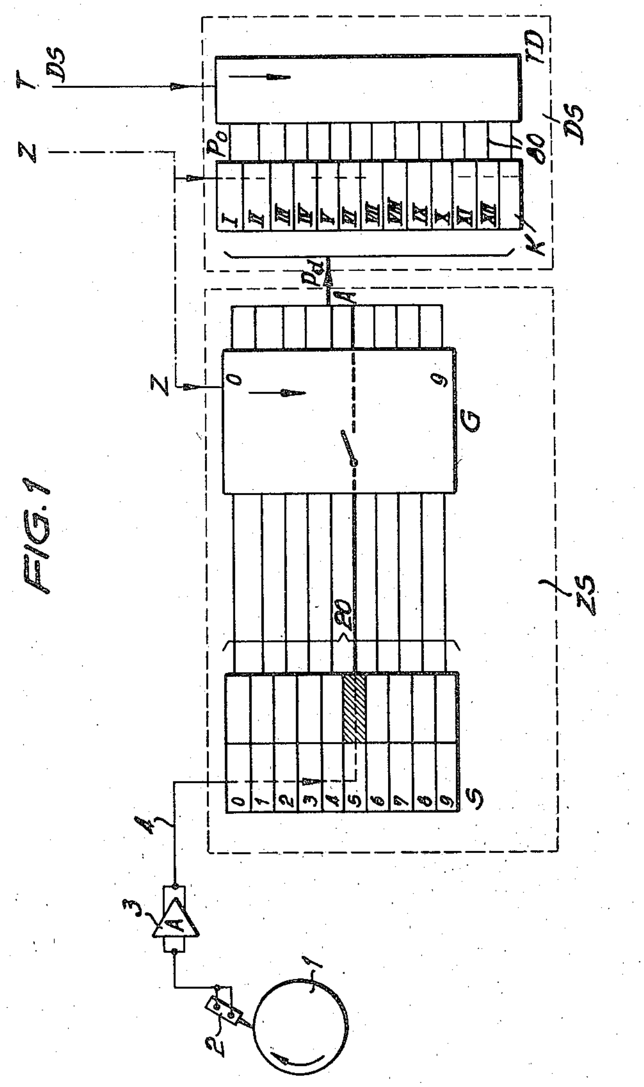

Referring now to Fig. 1 which is made up substantially as a block diagram, a magnetic storage drum 1 is combined with a pick-up head 2 which is connected via an amplifier 3 and a line 4 to a digit selector device ZS which in turn cooperates with an order selector DS. The printing apparatus to be controlled by the entire arrangement is not shown in this drawing because a number of types of such printing apparatus are entirely known and can all be used in connection with the arrangement according to the invention. The connection and adjustment of a conventional printing apparatus for use with the present control arrangement can be carried out by any skilled technician without difficulty. Some details will be described in reference to Fig. 6.

It may be assumed that the multi-order signal recorded on the drum 1 is a figure 515775. Assuming a printing apparatus is being used which is equipped with solenoid means for locking it in different printing positions of the printing discs, and assuming that this apparatus has reached the printing position for the digit value "5," then it is necessary that in this very moment the locking solenoids for the type rollers associated with the first, third and sixth order are actuated. This can be done by determining through an order selector which order positions apply to the digit "5" within the multi-order signal recorded on the drum.

According to the invention, this is done in the following manner:

The pick-up head 2 transmits the signals recorded or stored on the drum 1, these signals constituting a multi-order sequence of digit signals on one track. The individual signals corresponding to individual digits are then so converted by a series-parallel-converter device S that for instance five consecutive pulses or signals received from the drum 1 and intended to represent a digit value "5" are converted into one output signal delivered from the converter S on one of a plurality of output lines 20, actually on that particular output line which is connected to the element of the converter S that is assigned to handling the digit value "5."

This first step of the process is indicated in Fig. 1 by a dotted line in continuation of the line 4, a cross-hatched output section of the converter S and by emphasizing the particular line for "5" among the output lines 20.

In a similar manner, for instance a digit signal "7" coming from the drum would result in an output signal delivered over the particular line for "7" among the output lines 20.

The series-parallel-converter S feeds during operation output signals over one or the other of the ten output lines 20 towards a gate means G which in any one of its various positions permits only the passage of an output signal corresponding to one particular digit value. This gate means G is operated to move stepwise from one digit position to the other. This stepwise movement is caused by the printing apparatus in such a manner that the gate moves one step every time the printing apparatus moves from one to the next digit printing position. The operative connection between the printing apparatus and the gate means G is symbolized by a dash-dot line marked Z, and may consist for instance in photo-electronic impulse generators controlled by the stepwise movements of the above-mentioned toothed bar or toothed wheel elements of the printing apparatus. The important point is that at any time the gate is open only for that digit signal which corresponds to the printing position of the printing devices at the particular moment. Consequently, during one rotation or operational cycle of the printing apparatus the gate G moves consecutively between the positions corresponding to the digit values "0" to "9," simultaneously in every one of these positions channels for the digits "0" to "9" are consecutively opened. For instance, in the position illustrated by Fig. 1 the gate G is open for the digit value "5," so that now the entire digit selector means ZS is set for passing an impulse representing the digit value "5."

The adjoining portion of the apparatus is the order selector DS which serves to place the digit values into the correct order position, i.e. to apply them to the proper printing device associated with the particular order. The order selector DS mainly consists of a magnetic core register or coincidence device K and another magnetic core register or order switch TD. This latter order switch TD is operated electronically in synchronism with the operation of the magnet drum 1 and is caused, by suitable means not shown, through a line $T_{DS}$, to move one step, i.e. one order position, every time when the drum 1 has moved an amount which corresponds to the space between the record of the end of one digit signal and the end of the next following digit signal, i.e., the spacing between consecutive orders of the multi-order number signal.

The progressive stepwise switching of the order switch TD can be effected in various ways: for instance by pulses derived from markings recorded on the drum 1 between two consecutive digit signal records and possibly consisting of recordings differentiated by plus and minus signs, respectively, or for instance by means for a second magnetic track next to the magnetic track containing the multi-order number signals, said second magnetic track containing the markings or recordings from which can be derived through a separate pick-up head the impulses for stepwise switching the order switch TD. In any case, at any time the position of the order switch TD is in exact conformity with a corresponding or associated order of a particular digit passing the pick-up head 2 at this moment. From the order switch TD an impulse $p_0$ is injected into the coincidence device K through its connections 80 every time when the impulse arriving through $T_{DS}$ is shifted one step within the order switch TD so that in this manner the switch TD injects the impulses $p_0$ in every consecutive position into another one of the elements I—XII of the device K consecutively.

The second impulse $p_d$ required for the coincidence effect in the device K is furnished from the digit selector ZS via an output terminal A and is injected into the device K so as to influence all the elements thereof no matter with which order positions they are associated. However, every time when a digit impulse $p_d$ meets or coincides with an order impulse $p_o$ furnished by the order switch TD then a certain signal is stored in the particular element of the device K in which said two impulses have met. For instance, if in the third order position of the order selector DS a digit impulse representing the digit value "5" is furnished by the digit selector ZS then the element III of the order selector, or more specifically of the coincidence device K, is energized. If, for instance, later on during the particular transmission process a digit value "5" should appear in the eighth order of the multi-order number signal, then again the coincidence between the digit impulse $p_d$ representing "5" and the order impulse $p_o$ corresponding to the order position VIII will energize the element VIII of the device K.

Immediately after the above-mentioned certain signal is stored in the device K in a particular element thereof, and before the printing apparatus moves forward into the next digit printing position an actuating impulse is injected into the device K, for instance through a connection symbolized by the dash-dot line Z with the effect that from those elements I—XII where said signal had been stored an energizing impulse is transmitted via lines not shown in Fig. 1, to the above-mentioned solenoids of those of the printing devices which are associated with the order number of the particular element of the device K and which are in printing position for the digit corresponding to the impulse $p_d$ which has contributed to the particular signal stored in that element of the device K. In the present example of the multi-order number signal 515775 an impulse $p_d$ representing "5" would have coincided with impulses $p_o$ representing the orders I, III, VI. The various printing devices or printing discs of the printing apparatus, each corresponding to one order, are moved forward simultaneously from a printing position for "0" to the next following ones up to position "9." The digit selector ZS starts synchronously with the movement of the printing apparatus with collecting the digit value "0" and proceeds stepwise, in step with the stepwise movement of the printing devices, to the following digits up to digit "9." Consequently, each particular digit value is printed simultaneously in all those order positions in which it may appear in the multi-order number signal recorded on the drum 1, in the present example first all zeros and finally all the nines (if any). In case the drum 1 rotates in complete synchronism with the printing apparatus (which is not necessary) any multi-number signal recorded on the drum 1 would be completely translated and reproduced in print after ten revolutions of the drum 1.

As has been mentioned above, the drum 1 must complete at least one operational cycle or revolution opposite the pick-up head 2 before the type wheel or printing disc of the printing apparatus moves one step forward. To be on the safer side, it is recommended to have the drum 1 rotate slightly faster than indicated above.

Figure 1A:
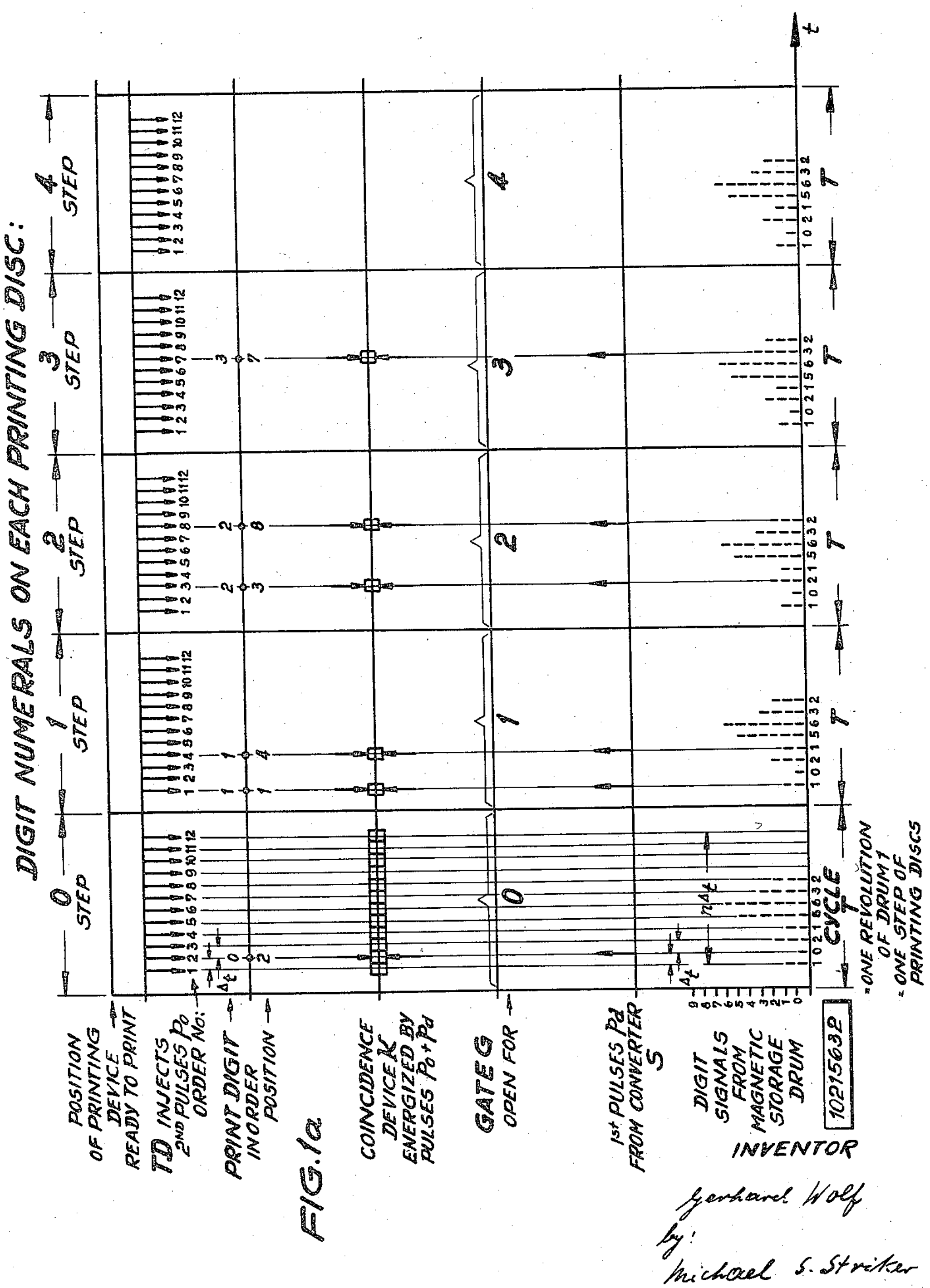

The diagram of Fig. 1*a* may serve to sum up and quite clearly describe the essential feature of the method according to this invention.

The diagram illustrates graphically the step-by-step development of the translation of a signal constituting the figure 10215632, plotted against time *t*. As can be seen at the bottom during every operational cycle of the drum 1 equalling at least one revolution thereof during a period T a sequence of digit signals corresponding to the consecutive digits of the figure 10215632 is picked up and furnished from the drum. Each digit signal is illustrated by one or more dashes indicating a corresponding number of pulses characteristic of the particular digit. It can be seen that the individual signals representing one digit are spaced from each other by time intervals $\Delta t$.

It can be seen at the top of the diagram that during each cycle T of the drum the printing device is in a different printing position, consecutively proceeding from "0" to the next following higher digits.

In step with the cycles T and the steps of the printing discs the gate G opens consecutively different passages corresponding to the printing positions of the printing discs during the same cycle, i.e. starting with "0" and proceeding to the next following higher digits.

The converter S therefore is only able to inject into the device K, during each cycle pulses $p_d$ representing digits passable through the gate G. The device TD injects pulses $p_o$ consecutively corresponding to the order positions of consecutive digits in the drum signal 10215632 in intervals $\Delta t$ into the device K.

Consequently, as shown in the upper part of the diagram the printing devices energized by the device K wherever coincidence of $p_o$ and $p_d$ occurs, prints in the first cycle T digit "0" in order position "2," in the next cycle T digit "1" in order positions "1" and "4," in the next cycle T digit "2" in order positions "3" and "8," in the next cycle T digit "3" in order position "7" and so on.

For the purpose of a complete disclosure, the various important components of the whole arrangement according to the invention are described herebelow with reference to Figs. 2–6.

Figure 2:
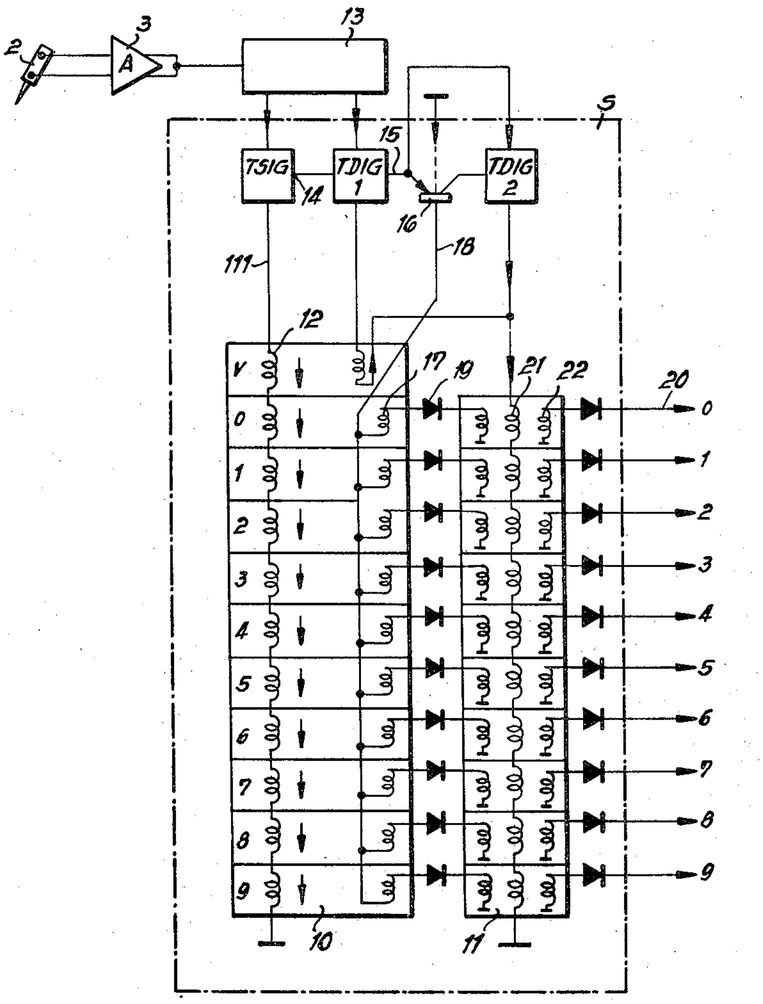
Fig. 2 is a simplified wiring diagram illustrating one portion of a preferred embodiment of an apparatus according to this invention.

Fig. 2 is a more detailed diagram of the series-parallel-converter S shown in Fig. 1. This converter essentially consists of magnet core registers which permit shifting of an information or signal stepwise within the register, the signal or information being represented by the condition of magnetization of the various cores or elements. The converter S comprises two functionally different magnetic registers, namely the stepwise switching register 10 and the register 11 composed of transfer elements required for the output of the various digit signals. The register 10 includes a series of shifting windings 12 in circuit with each other and with the impulse input line 111. The various windings 12, each associated with a different digit value in consecutive arrangement, plus one entrance winding V required for starting the operation, are marked with arrows in order to symbolize that by means of a shifting impulse injected through the line 111 the information present in the elements of this register is shifted one step in the direction of the arrow to the next element. Further details of this device will be explained further below.

The impulses furnished by the magnetic pick-up 2 pass through an amplifier 3 and reach a converter 13. This converter serves to convert the impulses into a number of pulses in accordance with the represented digit value, i.e. for instance into five pulses to represent the digit "5." However, this is only necessary if the multi-order number signal is registered or recorded on the drum 1 in accordance with a code system and not in the form of a decimal system. In addition, the converter 13 has to indicate the beginning and the ending of the individual digit signals. This can be effected in various ways depending upon the system used for recording the multi-order signal on the drum. If, for instance, positive and negative impulses are recorded on the drum 1 then a signal indicating the end of a digit signal can easily be obtained by adding a tenth signal to the available set of nine different digit signals.

The converter 13 feeds the two impulse generators TSIG and TDIG–1. The generator TDIG–1 serves to prime the register 10 and to place it into starting condition. Then, by means of a delayed signal transmitted from said generator via line 14 the other generator TSIG is actuated for furnishing a first shifting impulse whereby the information is shifted from the element V of the register 10 into the element 0 of this register. If now either through the converter 13 or directly from the drum record five consecutive pulses are furnished in order to represent the digit value "5" then this information will arrive in the element 5 of the register 10. After the transmission of the pulses representing one digit has been completed another impulse is furnished through the generator TDIG–1 via line 14 whereby the information stored in the element 5 of the register 10 is ejected and transferred into the associated element of the register 11. Simultaneously, the entrance element V of the register 10 is placed into starting condition as described above so as to be ready for the next digit signal.

The transmission into the register 11 is ordinarily blocked by the gate transistor 16 and is only possible by the injection of a delayed impulse from the generator TDIG–1 via line 15 every time at the moment of completion of one digit signal. In this manner, the information travels first from the element V to the element 0 and from there to the element 5 of the register 10 whereafter it is transferred to the corresponding fifth element of the register 11 because the digit signal "5" is completely processed when the information has reached the element "5" of the register 10.

The gate circuit between the registers 10 and 11 functions as follows: all the windings 17 provided on the respective magnet core elements of the register 10 are in circuit with a common line 18 connected to the collector of the gate transistor 16. A flow of current through any one of the windings 17 in direction toward the associated diodes 19, respectively, is only possible when the gate transistor 16 is opened by an impulse via line 15. This opening of the transistor 16 is effected at the moment of completion of each digit signal in order to transmit the information shifted in the register 10 to a particular element thereof, towards the proper output line 20 respectively associated with the particular element of the register 10, as indicated by the corresponding reference numerals 0–9 along the arrows along the series of output lines 20.

In order to obtain in the output lines 20 signals of sufficient amplitude a magnetic amplification is preferably carried out by injecting an impulse into the elements of the register 11. The various windings of the elements of the register 11 are arranged with such polarities that upon injection of an information via a diode 19 no signal appears at the corresponding output line 20. The energy which is required for reversing the magnetization of one element of the register 11 corresponds only to the energy required for reversing the magnetization of the particular magnet core. In the case of injection of an impulse from the further impulse generator TDIG–2 the windings 21 and 22 in the various elements of the register 11 act like an impulse transformer, the energy being furnished by the generator TDIG–2. By using this method which is known per se a considerable amplification of power and energy of a stored signal can be achieved.

Summing up, the operation of the series-parallel-converter S can be described by stating that when, for instance, 5 pulses are furnished from the drum, that line 20 which is associated with the digit "5" yields an output impulse. This output impulse is then processed by the digit selector, actually the gate means G as indicated in Fig. 1. This cyclically switching gate means has the task to permit only the passage of signals which arrive via an output line selected by the action of the series-parallel-converter S. The gate means G is required in connection with the preferred printing method described in this specification.

Figure 6:
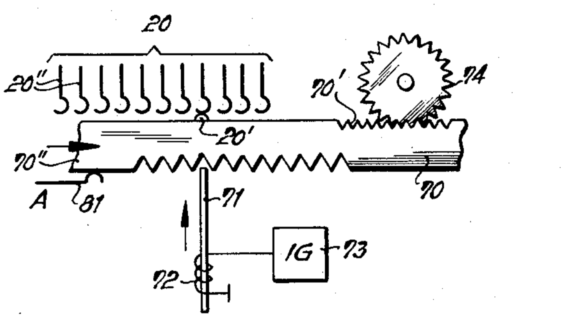
Fig. 6 is a diagrammatic illustration of a printing apparatus that may be used in connection with the apparatus of Figs. 2 and 3.

This particular preferred printing method is illustrated diagrammatically by Fig. 6 which shows only a set of components referring to or associated with one signal order of the multi-order information. Essentially, the printing device comprises a toothed bar 70 and a locking pawl 71 which can be actuated by a solenoid 72 to move in the direction of the arrow into any one of the recesses between the consecutive teeth of bar 70, each of these recesses being associated and marked to correspond to one of the digits or numerals provided on a printing disc operatively connected with the gear 74 meshing with a set of rack teeth 70′ on bar 70. During the operation of the printing device the bar 70 and the gear 74 with the attached printing disc (not shown) move continuously in one direction as indicated by the arrow. If one particular numeral or digit is to be printed the bar 70, and thereby the printing disc, must be stopped by engagement of the pawl 71 with that particular recess which is associated with that digit for which the printing disc is in printing position at the particular moment. This can be achieved in a very simple manner if the rod 70 is operatively or mechanically connected with a sliding element 70″ diagrammatically indicated in Fig. 3. The common terminal A may be in sliding contact at 81 with the bar 70 or the sliding element 70″ while the bar 70 carries a contact 20′ which during the movement of the bar 70 would travel along a series of contacts 20″ each constituting the end of one of the output lines 20 shown in Fig. 1. If the contacts 20″ are spaced accordingly, the contact 20′ will establish a connection between the terminal A and that particular output line 20 which corresponds to the digit for which the bar 70 and the contact 20′ are in the position in which printing of the particular digit can be effected.

Figure 3:
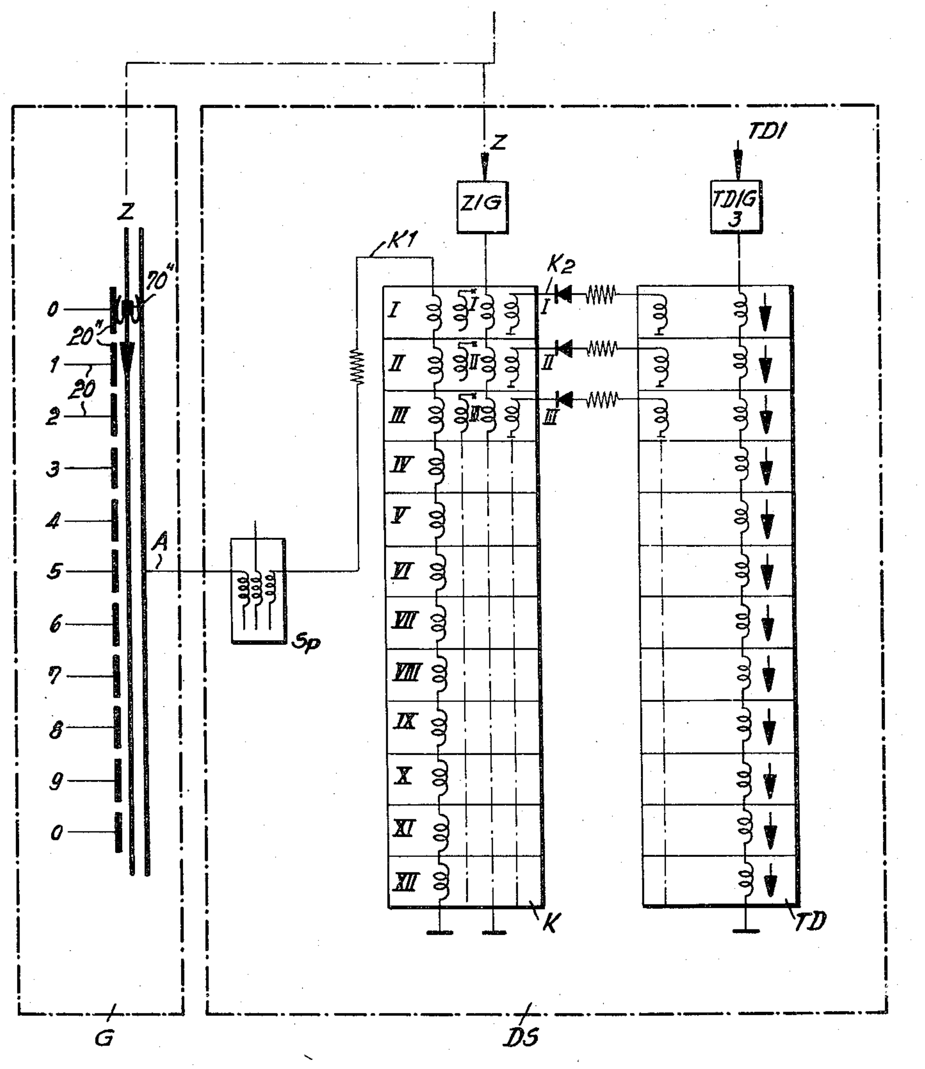
Fig. 3 is a simplified wiring diagram illustrating another portion of the apparatus according to this invention.

The portion DS shown in Fig. 3 and otherwise termed the combining means in this arrangement has the task to determine which order of a multi-order signal applies to a particular digit value. This can be achieved in accordance with the invention by the use of the above-described coincidence device K. The performance of the device K is explained below in greater detail in reference to Fig. 3. For the purpose of determining the applicable order again a magnet core register capable of shifting information, similar to the register 10, is used. For this purpose, registers constructed according to the Wang or Woo principle may be used, but other registers with a different shifting mechanism may be used as well. After the entrance element of the register K has been primed in a manner and by means which hardly require description in the present case, an information is injected which is shifted from one element of the register K to the next one every time the multi-order number signal proceeds from one digit to the next which is in this case identical with proceeding from one order to the next order. In this manner, the above-mentioned coincidence of an impulse $p_d$ characteristic of a digit and an impulse $p_o$ characteristic of its order position can be determined and stored as a signal in one of the elements of the register K. The impulse $p_d$ cause a magnetization of a first winding of each element via the line $K_1$. The impulses $p_o$, however, are applied to another winding of the various elements, respectively, via one of the lines $K_2$. It is necessary that the magnet cores have a definite predetermined coercitive force. Under this condition magnetic fields can be induced via the line $K_1$ and the line $K_2$, respectively, each of which is somewhat larger than one half of the coercitive force of the individual core. Now, when the pulses $p_o$ and $p_d$ coincide and meet in the windings of one particular element then the magnetization is sufficient for storing in the particular element the particular information. In order to assure precise coincidence of time, the line $K_1$ and the windings in circuit therewith are not supplied directly from the digit selector or gate G but via an intermediate storage means Sp from which an impulse is obtained at the moment when the switch register TD moves one step. In this manner the coincidence of time is reliably obtained. If now an actuating impulse is injected into the register K at the proper moment depending upon the position of the mechanical moving means of the printing apparatus the energization of the solenoids which cause the actual printing impression, can be effected. The actuating impulses for the register K are furnished by a secondary impulse generating means ZIG while the actuating impulses for the steps of the switch register TD is furnished by generator means TDIG–3.

Each element of the register K carries a fourth winding 40 which is connected by lines not shown with the above mentioned solenoids of the printing devices or possibly with impulse generators controlling said solenoids.

Figure 4:
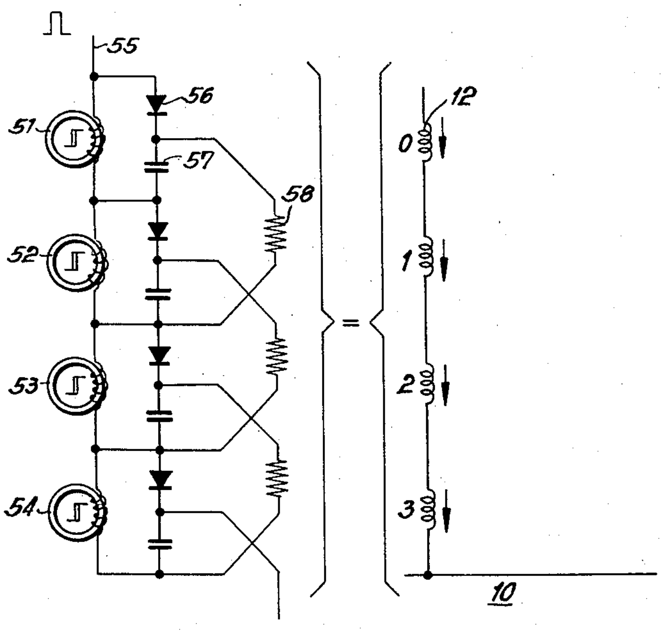
Fig. 4 is a simplified diagram of a magnetic register forming a component of the apparatus illustrated by Figs. 2 and 3.
Figure 5:
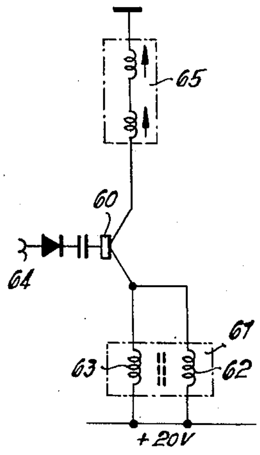
Fig. 5 is a diagram illustrating one of the impulse generators forming a component of the apparatus illustrated by Figs. 2 and 3.

Details of a shifting magnetic register as for instance the register 10 in Fig. 2 is explained in more detail in reference to Fig. 4. The register is composed of a series of magnetic core elements characterized by a rectangular hysteresis loop. It is typical for register elements of this type that for shifting the information only one single winding is required which also handles the shifting impulses. Up to now it was customary to arrange three separate windings on each magnet core of such a shifting register. The register illustrated by Fig. 4 comprises a number of cores 51, 52, 53, 54.

If one assumes that the core 51 holds an information which is represented by the condition of magnetization of this core, then this magnetization is so polarized that an impulse injected via line 55 reverses the magnetization of this core 51 while the other magnet cores remain unaffected. The reverse of the magnetization of the core 51 generates a counter voltage which appears as a voltage drop across the winding of the core 51 whereby the condenser 57 is charged via the diode 56. The condenser 57 in turn tends to discharge via the resistor 58, the resulting current finding its way through the winding on the next following magnet core 52. The various element circuits are intermeshed in such a manner that the direction of flow of the current passing the resistor 58 is opposite to that one which is typical of the current produced by the impulse injected via line 55. Consequently, while a certain information is expelled from the core 51 and thus cancelled out by the effect of an impulse arriving via line 55, the current flowing through the resistor 58 causes by passing through the winding of core 52 a reverse of the magnetization of this core which means that the information has been shifted by this procedure from one element of the register to the next one. The further shifting of information from element to element is effected in analogous manner. In order not to complicate the illustration in the block diagrams, the shifting and switching mechanism of these register elements is illustrated only diagrammatically as is indicated in the right half of Fig. 4, namely by showing only the windings 12 with a directional arrow and with a numeral indicating the consecutive number of the particular element or the digit with which it is associated.

Finally it appears advisable to explain the operation of the various impulse generators used in the arrangement described above, as for instance the generators TSIG, TDIG–1 to –3, ZIG and 73. In a very simple embodiment of such a generator a transistor impulse generator can be used which operates similar to the well known blocking oscillator. Such a generator comprises a transistor 60 cooperating with a magnet core 61 carrying windings 62 and 63 which are so polarized that upon injection of a trigger signal via line 64 a feed-back is produced. The duration of this feedback impulse is predetermined by the magnetic characteristics of the magnet core 61 and by the number of turns of the windings provided on this core. There is no difficulty to produce impulse durations between several μsec and several msec. Then the collector electrode of the transistor 60 can be placed in circuit, without reactive effects, with a magnet register 65 (i.e. for instance the register 10 of Fig. 2 or the register TD of Fig. 3) or with an operating solenoid of the printing apparatus.

It should be noted that the details of a shifting register as illustrated by Fig. 4 are disclosed in my copending application Serial Number 666,096.

It will be understood that each of the elements described above, or two or more together, may also find a useful application in other types of methods and apparatus for translating signals differing from the types described above.

While the invention has been illustrated and described as embodied in a method and apparatus for translating multi-order signals from a magnetic record of print, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of controlling a multi-order printing apparatus having for every order an individual digit printing device moving sequentially from one to the next digit printing position, for reproducing in print multi-order number signals which may contain any digit value in each individual order and are recorded on a magnetic storage means capable of delivering in each operational cycle one complete multi-order signal, comprising the steps of picking up in cyclical repetition from the multi-order number signal record on said storage means in timed sequence digit signals each representing the individual digit value that may be present in consecutive orders of said multi-order number signal record, each cycle being in step with the movement of said printing devices from one digit position to the next one; generating during each cycle consecutive impulses in step with said timed sequence of said digit signals, said impulses being individually associated with the individual consecutive orders, respectively, of said multi-order number signal; combining with individual digit signals with said impulses so as to obtain a sequence of output signals, each being characteristic of a digit value and of its order position in the multi-order number to be reproduced; and actuating said printing apparatus by each of said output signals for printing the particular digit in its order position as indicated by the respective output signal.

2. Method of controlling a multi-order printing apparatus having for every order an individual digit printing device moving sequentially from one to the next digit printing position, for reproducing in print multi-order number signals which may contain any digit value in each individual order and are recorded on a magnetic storage means capable of delivering in each operational cycle one complete multi-order signal, comprising the steps of picking up in cyclical repetition from the multi-order number signal record on said storage means in timed sequence digit signals each representing the individual digit value that may be present in consecutive orders of said multi-order number signal record, each cycle being in step with the movement of said printing devices from one digit position to the next one; selectively opening during each cycle a digit channel associated with one particular digit value and switching consecutively, from cycle to cycle, to a channel associated with the digit value next following said partial digit value in magnitude; converting each of said picked-up digit signals into a corresponding first impulse and injecting into the channel opened during the particular cycle those of said digit signals converted into said first impulses the digit value of which is associated with said opened channel; generating consecutive second impulses in step with the timed sequence of said converted digit signals detected from said record; and superimposing during each cycle at least one of said second impulses over at least one of those first impulses injected during the particular cycle into the corresponding selected channel, for creating an output impulse of sufficient strength to operate that element of said printing apparatus which is associated with the particular channel, order and digit and is in printing position during the particular cycle, whereby during each operational cycle of said magnetic storage means one digit value present in one or more orders of said multi-order number signal record is printed in the respective order positions until after a number of cycles corresponding to the number of orders in said multi-order number signal record all digits present in all orders are printed.

3. Arrangement for controlling a multi-order printing apparatus having for every order an individual digit printing device moving sequentially from one to the next digit printing position, for reproducing in print multi-order number signals which may contain any digit value in each individual order and are recorded on a magnetic storage means capable of delivering in each operational cycle one complete multi-order signal, comprising, in combination, means for picking up in cyclical repetition from the multi-order number signal record on said storage means in timed sequence digit signals each representing the individual digit value that may be present in consecutive orders of said multi-order number signal record, each cycle being in step with the movement of said printing devices from one digit position to the next one; means for generating during each cycle consecutive impulses in step with said timed sequence of said digit signals, said impulses being individually associated with the individual consecutive orders, respectively, of said multi-order number signal; means, operatively connected with said means for picking up signals and with said means for generating impulses, for combining said individual digit signals with said impulses so as to obtain a sequence of output signals, each being characteristic of a digit value and of its order position in the multi-order number to be reproduced; and means, operatively connected with said means for combining said signals with said impulses, for actuating said printing apparatus by each of said output signals for printing the particular digit in its order position as indicated by the respective output signal.

4. Arrangement for controlling a multi-order printing apparatus having for every order an individual digit printing device moving sequentially from one to the next digit printing position, for reproducing in print multi-order number signals which may contain any digit value in each individual order and are recorded on a magnetic storage means capable of delivering in each operational cycle one complete multi-order signal, comprising, in combination, pickup means for picking up in cyclical repetition from the multi-order number signal record on said storage means in timed sequence digit signals each representing the individual digit value that may be present in consecutive orders of said multi-order number signal record, each cycle being in step with the movement of said printing devices from one digit position to the next one; gate means including a plurality of channels and switch means for selectively opening during each cycle a digit channel associated with one particular digit value, and switching consecutively, from cycle to cycle, to a channel associated with the digit value next following said particular digit value in magnitude, said gate means including an output terminal selectively connected by said switch means to that digit channel which is opened; converter means for converting each of said picked-up digit signals into a corresponding first impulse and for injecting into the channel opened during the particular cycle those of said digit signals converted into said first impulses the digit value of which is associated with said opened channel, said converter means being connected between said pickup means and said gate means; generator means for generating consecutive second impulses in step with said timed sequence of said converted digit signals detected from said record; impulse combining means connected between said gate means and said generator means for superimposing during each cycle at least one of said second impulses over at least one of those first impulses injected during the particular cycle into the corresponding selected channel, so as to create an output impulse of a strength greater than that of either one of said superimposed impulses alone; and circuit means connecting said impulse combining means with said printing apparatus for applying said output impulse to that element of said printing apparatus which is associated with the particular channel, order and digit and is in printing position during the particular cycle, whereby during each operational cycle of said magnetic storage means one digit value present in one or more orders of said multi-order number signal record is printed in the respective order positions until after a number of cycles corresponding to the number of orders in said multi-order number signal record all digits present in all orders are printed.

5. Arrangement as set forth in claim 4, wherein said converter means include a first magnetic register comprising a plurality of magnetic core members respectively associated with said digit signals and of corresponding magnetizing windings in circuit with each other for shifting a signal impulse received from said pickup means from member to member; a transfer register comprising a plurality of output elements respectively associated and operatively connected with said magnetic core members of said first register and in circuit with each other; and impulse generating means capable of reacting to each termination of one of said digit signal impulses by injecting an actuating impulse into said first magnetic register device for placing it into starting condition for the next signal and for simultaneously closing the circuit containing said output elements so as to cause said signal impulse to be ejected from the one of said output elements which is associated with that one of said magnetizing windings and core members to which said signal impulse has been shifted at the time when said circuit containing said output elements is closed; and a plurality of output lines respectively connected to said output elements and to said gate means and each constituting a digit channel associated with one of the different digits that may be contained in said multi-order number signal.

6. Arrangement as set forth in claim 4, wherein said impulse combining means include a second magnetic register comprising a plurality of magnetic core members respectively associated with consecutive orders of said multi-order number signal, and of corresponding magnetizing windings in circuit with each other and with said generator means for shifting an impulse received from said generator means from member to member in said timed sequence; a secondary impulse generating means operatively connected with said printing apparatus for generating actuating impulses in step with the movements of said digit printing devices from one to the next digit printing position; a third magnetic register comprising a plurality of magnetic core members respectively associated with consecutive orders of said multi-order number signal, and of corresponding groups of four windings, a series composed of one of the windings of each of said groups being in circuit with each other and with said output terminal of said gate means for receiving said first impulses through an opened channel, a series composed of the second one of the windings of each of said groups being in circuit with each other and with said secondary impulse generating means for receiving said actuating impulses in step with the changes of the printing positions of said printing devices, each third winding of said groups of windings being connected with one of said magnetizing windings, respectively, of said second magnetic register for transmitting said second impulses in consecutive order to the respectively associated third winding of said groups of windings, each fourth winding of said groups of windings being connected with one of said printing devices for actuating the latter when one of said first impulses and one of said second impulses coincide in one of said core members of said third magnetic register.

7. Arrangement as set forth in claim 5, wherein said gate means include a plurality of control sets, each set including a control member associated and operatively connected with one of said digit printing devices for being moved a predetermined step whenever the associated printing device is moved from one to the next digit printing position, said control member carrying a fixed contact conductively connected to said output terminal, a set of stationary contacts associated with said control member, and each contact being connected to one of said output lines, each set being located along the path of said fixed contact on the associated control member so that with every step of said control members a different one of said stationary contacts is caused to abut against said fixed contacts to open thereby one of said channels.

8. Arrangement for controlling a multi-order printing apparatus having for every order an individual digit printing device moving sequentially from one to the next digit printing position, for reproducing in print multi-order number signals which may contain any digit value in each individual order and are recorded on a magnetic storage means capable of delivering in each operational cycle one complete multi-order signal, comprising, in combination, pickup means for picking up in cyclical repetition from the multi-order number signal record on said storage means in timed sequence digit signals each representing the individual digit value that may be present in consecutive orders of said multi-order number signal record, each cycle being in step with the movement of said printing devices from one digit position to the next one; gate means including a plurality of channels and switch means for selectively opening during each cycle a digit channel associated with one particular digit value, and switching consecutively, from cycle to cycle, to a channel associated with the digit value next following said particular digit value in magnitude, said gate means including an output terminal selectively connected by said switch means with that digit channel which is opened, said gate means including a plurality of control sets, each set including a control member associated and operatively connected with one of said digit printing devices for being moved a predetermined step whenever the associated printing device is moved from one to the next digit printing position, said control member carrying a fixed contact conductively connected to said output terminal, a set of stationary contacts associated with said control member, and each contact being connected to one of said output lines, each set being located along the path of said fixed contact on the associated control member so that with every step of said control members a different one of said stationary contacts is caused to abut against said fixed contacts to open thereby one of said channels; converter means for converting each of said picked-up digit signals into a corresponding first impulse and for injecting into the channel opened during the particular cycle those of said digit signals converted into said first impulses the digit value of which is associated with said opened channel, said converter means including a first magnetic register comprising a plurality of magnetic core members respectively associated with said digit signals and of corresponding magnetizing windings in circuit with each other for shifting a signal impulse received from said pickup means from member to member; a transfer register comprising a plurality of output elements respectively associated and operatively connected with said magnetic core members of said first register and in circuit with each other; impulse generating means capable of reacting to each termination of one of said digit signal impulses by injecting an actuating impulse into said first magnetic register device for placing it into starting condtion for the next signal and for simultaneously closing the circuit containing said output elements so as to cause said signal impulse to be ejected from the one of said output elements which is associated with that one of said magnetizing windings and core members to which said signal impulse has been shifted at the time when said circuit containing said output elements is closed; and a plurality of output lines respectively connected to said output elements and to said gate means and each constituting a digit channel associated with one of the different digits; generator means for generating consecutive second impulses in step with said timed sequence of said converted digit signals detected from said record; impulse combining means connected between said gate means and said generator means for superimposing during each cycle at least one of said second impulses over at least one of those first impulses injected during the particular cycle into the corresponding selected channel, so as to create an output impulse of a strength greater than that of either one of said superimposed impulses alone; and circuit means connecting said impulse combining means with said printing apparatus for applying said output impulse to that element of said printing apparatus which is associated with the particular channel, order and digit and is in printing position during the particular cycle, said impulse combining means including a second magnetic register comprising a plurality of magnetic core members respectively associated with consecutive orders of said multi-order number signal, and of corresponding magnetizing windings in circuit with each other and with said generator means for shifting an impulse received from said generator means from member to member in said timed sequence; a secondary impulse generating means operatively connected with said printing apparatus for generating actuating impulses in step with the movements of said digit printing devices from one to the next digit printing position; a third magnetic register comprising a plurality of magnetic core members respectively associated with consecutive orders of said multi-order number signal, and of corresponding groups of four windings, a series composed of one of the windings of each of said groups being in circuit with each other and with said output terminal of said gate means for receiving said first impulses through an opened channel, a series composed of the second one of the windings, of each of said groups being in circuit with each other and with said secondary impulse generating means for receiving said actuating impulses in step with the changes of the printing positions of said printing devices, each third winding of said groups of windings being connected with one of said magnetizing windings, respectively, of said second magnetic register for transmitting said second impulses in consecutive order to the respectively associated third winding of said groups of windings, each fourth winding of said groups of windings being connected with one of said printing devices for actuating the latter when one of said first impulses and one of said second impulses coincide in one of said core members of said third magnetic register, whereby during each operational cycle of said magnetic storage means one digit value present in one or more orders of said multi-order number signal record is printed in the respective order positions until after a number of cycles corresponding to the number of orders in said multi-order number signal record all digits present in all orders are printed.

No references cited.